United States Patent [19]
Kim

[11] Patent Number: 5,889,480
[45] Date of Patent: Mar. 30, 1999

[54] FULL DUPLEX SERIAL CODEC INTERFACE WITH DMA

[75] Inventor: Hoyoung Kim, San Jose, Calif.

[73] Assignee: Samsung Electronics Co., Ltd., Seoul, Rep. of Korea

[21] Appl. No.: 730,864

[22] Filed: Oct. 18, 1996

[51] Int. Cl.[6] .................................................. G06F 13/00
[52] U.S. Cl. .......................... 341/50; 395/889; 395/842
[58] Field of Search ................... 341/50, 106; 395/889, 395/842

[56] References Cited

U.S. PATENT DOCUMENTS

| | | | |
|---|---|---|---|
| 5,297,231 | 3/1994 | Miller | 395/2.1 |
| 5,530,902 | 6/1996 | McRoberts et al. | 395/848 |
| 5,553,220 | 9/1996 | Keene | 395/154 |

OTHER PUBLICATIONS

"Serial Port 16–Bit SoundComm Codec", Analog Devices AD1843, pp. 20–25, (1996).

*Primary Examiner*—Brian Young
*Assistant Examiner*—Peguy JeanPierre
*Attorney, Agent, or Firm*—Skjerven, Morrill, MacPherson, Franklin & Friel; David T. Millers

[57] ABSTRACT

A system having a serial interface for a codec containing multiple converters employs a local memory and a DMA (direct memory access) unit for transferring data to and from the codec. To distinguish data associated with each converter, a separate DMA channel is assigned to each converter. Data is transmitted in frames having fields associated with different DMA channels to avoid confusion regarding the source or destination of data.

6 Claims, 7 Drawing Sheets

FULL DUPLEX SERIAL CODEC INTERFACE WITH DMA

BACKGROUND OF THE INVENTION

1. Field of the Invention

This invention relates to circuits and methods for transferring information to and from an integrated circuit and particularly relates to a system using DMA operations with a serial interface connected to a codec.

2. Description of Related Art

A serial interface is desirable for connection to a codec (coder/decoder) that require relatively low data transfer rates because serial interfaces require few input/output pins. An ideal application for a serial interface is audio and communications codecs where data transfer rates are often low enough that a single serial interface can transmit data to and from multiple digital-to-analog and analog-to-digital converts (DACs and ADCs). A concern in such interfaces is distinguishing data for one converter from data for another converter which is connected to the same interface. The interface must identify the source and/or destination of digital data and route the data appropriately. Complex circuitry can be required to distinguish and separate data associated with multiple DACs and ADCs connected to the same serial interface. Accordingly, simpler serial interface architectures are desired which can handle multiple DACs and ADCs and properly direct data.

SUMMARY OF THE INVENTION

In accordance with an embodiment of the invention, an interface circuit uses only four pins for full duplex data transfers for a codec containing multiple DACs and ADCs. The four pins include a serial data output pin, a serial data input pin, a frame synchronization clock pin, and a bit clock pin. The system further employs a DMA (direct memory access) unit for transferring data between the codec and a local memory. To distinguish data associated with each DAC or ADC, a separate DMA channel is assigned to each DAC or ADC, and data is transmitted in frames having fields associated with particular channels.

In one embodiment of the invention, a serial codec interface includes: a shift register which generates a serial data signal corresponding to values of bits shifted out of the shift register; a first buffer coupled for loading of a value from the first buffer into a first field in the shift register; a second buffer coupled for loading of a value from the second buffer into a second field in the shift register; and a direct memory access unit having multiple channels, wherein a first channel supplies data from a memory to the first buffer, and a second channel supplies data from the memory to the second buffer. The serial codec may additionally or alternatively include: a second shift register which stores data from a serial input data; a third buffer coupled to load a value from a first field in the second shift register; and a fourth buffer coupled to load a value from a second field in the second shift register, wherein the direct memory access unit further provides a third channel which transfers data values from the third buffer to the memory, and a fourth channel which transfers data values from the fourth register to the memory.

The processes and serial interface in accordance with the invention are well suited for a signal processor having a local memory to and from which DMA operations can be conducted.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a serial interface is attached to a DMA controller which moves data between the serial interface and a local memory. The serial interface can be used with a codec containing multiple converters (ADCs or DACs), and several separate DMA channels can be employed for the various converters. Association of data with a particular ADC or DAC can be determined from the DMA channel which transfers the data. Such interfaces are well suited for processors which have local memory because DMA operations can transfer data between local memory and a codec without processor intervention. Additionally, the processor can process the data in the local memory.

Figure 1:
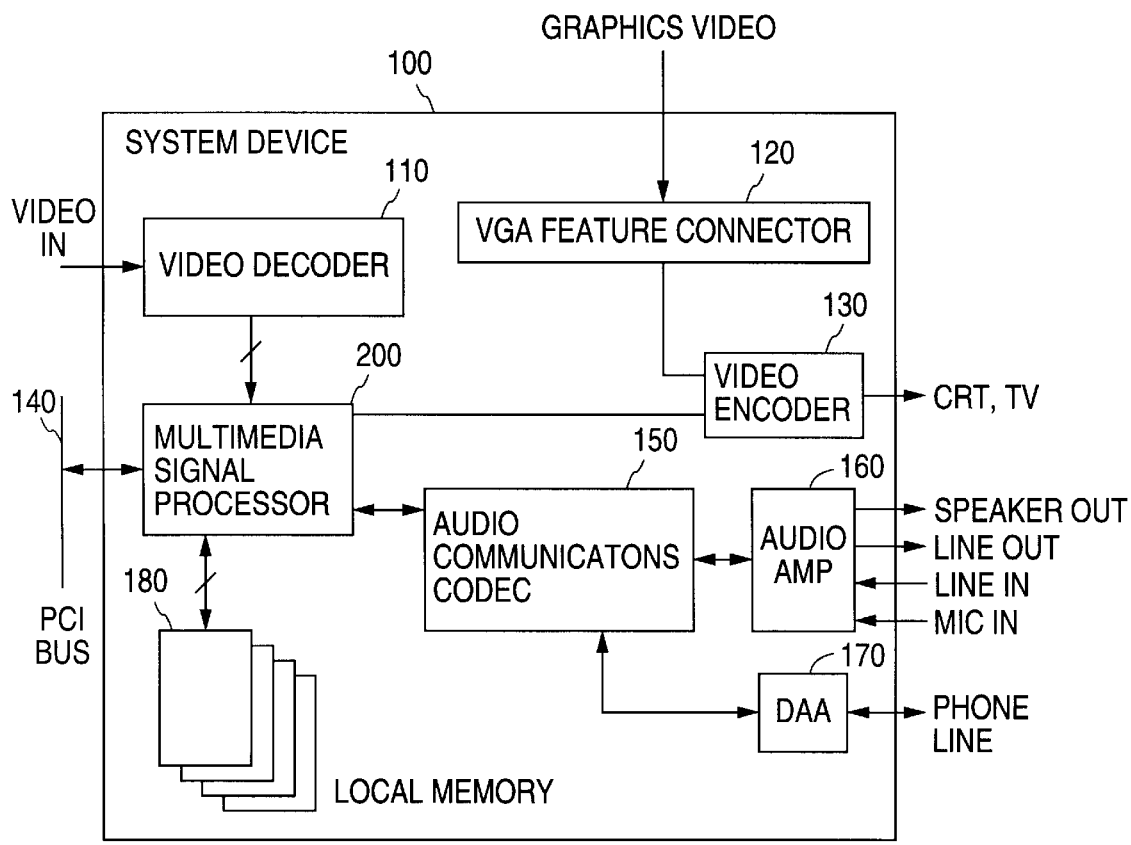
FIG. 1 is a block diagram of a multimedia device which employs a serial codec interface in accordance with an embodiment of invention.

FIG. 1 shows an embodiment of a multimedia device 100 capable of implementing a variety of multimedia operations including sound card emulation in accordance with an embodiment of the invention. Device 100 connects to a PCI bus 140 of a host computer (not shown) and includes a multimedia signal processor (MSP) 200 and a local memory 180 which stores data and instructions for MSP 200. The host computer and device 100 execute separate programs which co-operate to perform desired multimedia functions. With the appropriate software for MSP 200, device 100 can perform functions including: video capture; digital video to NTSC or PAL signal conversion; JPEG, MPEG I, and MPEG II encoding and decoding; video image overlay into a graphics image; FM and wavetable sound synthesis; sound card emulation; facsimile and modem communications; and video conferencing.

For video processing, device 100 includes a video decoder 110 that handles input video signals to be processed by MSP 200 and a video encoder 130 which converts video information to a video signal for a television or a video monitor. A separate graphics card (not shown) supplies graphics data to video encoder 130 via a feature connector 120. In one embodiment, feature connector 120 follows an industry standard interface implemented by graphics card manufactures for transferring graphics data from VGA graphics cards.

An audio/communications codec 150 which performs analog-to-digital and digital-to-analog conversions creates a bridge between MSP 200 and analog systems such as an audio input/output amplifier 160 and a data access arrangement (DAA) circuit 170. For example, when the host computer sends appropriate data or commands to device 100 via bus 140, MSP 200 executes sound card emulation software which implements sound generation techniques such as FM or wavetable synthesis as requested by the host computer. Execution of the sound card software generates sound samples which according to an aspect of the invention are stored in local memory 180. DMA operations transfer the sound samples from local memory 180 to a codec interface in MSP 200 which is connected to codec 150. Codec 150 converts the sound samples to an analog audio signal. For digital sound recording, codec 150 provides sound samples to the codec interface, and a DMA operation stores the sound samples in local memory 180 for processing by MSP 200 or transfer to the host computer.

For communications processing, codec 150 digitizes an analog communication signal derived from a telephone line and passes the digitized samples to a codec interface. A DMA operation transfers the samples from the codec interface to local memory 180. MSP 200 executes modem, facsimile, or videophone software to demodulate, decompress, and otherwise extract data from the digitized samples in local memory. For transmission of data on telephone lines, MSP 200 receives data from the host computer and generates a sequence of samples representing an analog signal according to a protocol for conveying the data. The samples are stored in local memory 180 and transferred to codec 150 via a DMA operation. Codec 150 converts the samples to an analog signal which is transmitted through DAA circuit 170.

Figure 2:
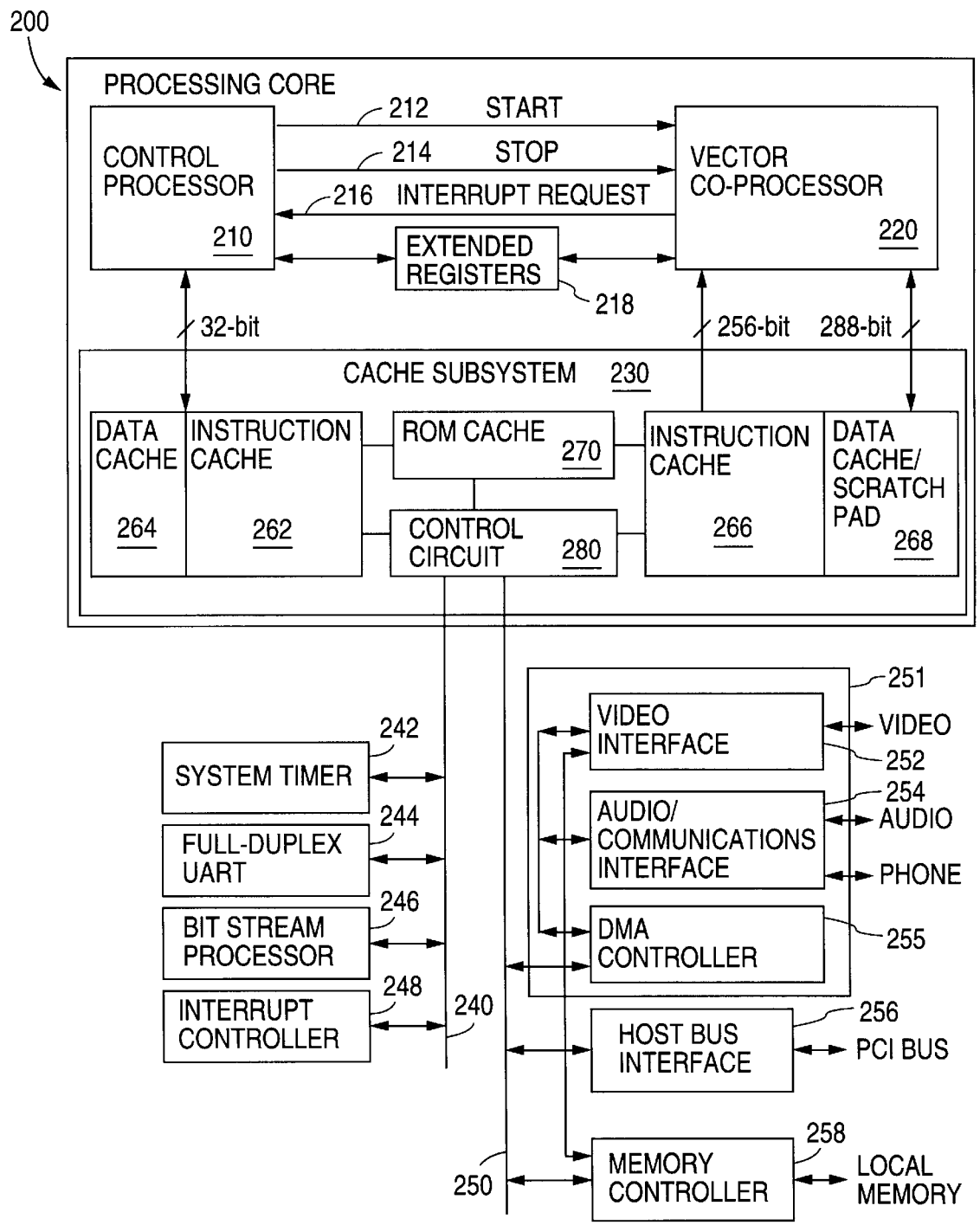
FIG. 2 is a block diagram of a multimedia signal processor for the device of FIG. 1.

FIG. 2 shows a block diagram of the exemplary embodiment of MSP 200. MSP 200 is an integrated multiprocessor which includes a general-purpose processor 210 and a vector processor 220. In an exemplary embodiment of the invention, processor 210 implements the ARM7 architecture and instruction set described in the "ARM7DM Data Sheet", Document Number: ARM DDI 0010G which is available from Advance RISC Machines Ltd.; and vector processor 220 implements the instruction set described in U.S. patent app. Ser. No. 08/699,597. Processors 210 and 220 execute separate program threads and are structurally different for more efficient execution of particular tasks. Processor 210 executes a real-time operating system, exception routines for both processors 210 and 220, and general processes not requiring large numbers of repetitive calculations. The real-time operating system allows multitasking for simultaneous execution of software for multiple functions. Processor 210 also controls initialization, starting, and stopping of vector processor 220. Vector processor 220 performs number crunching including repetitive operations on large data blocks that are common in multimedia processing.

Processors 210 and 220 communicate with each other through direct lines 212, 214, and 216 or through shared extended registers 218. Processors 210 and 220 communicate with other on-chip components through a cache subsystem 230 which contains an instruction cache 262 and a data cache 264 for processor 210 and an instruction cache 266 and data cache/scratch pad 268 for vector processor 220. Cache subsystem 230 also includes a ROM cache 270 and control circuitry 280. Cache subsystem 230 acts as a switching station for processor 210, processor 220, and on-chip devices coupled to busses 240 and 250. U.S. patent app. Ser. No. 08/697,102 further describes operation of a cache subsystem 230.

Bus 240, which is sometimes referred to herein as IOBUS 240, connects to on-chip devices such as a system timer 242, a UART (universal asynchronous receiver transceiver) 244, a bitstream processor 246, and an interrupt controller 248.

Bus 250, sometimes referred to herein as FBUS 250, operates at a higher clock frequency than bus 240 and is connected to on-chip devices such as an ASIC interface 251, a host interface 256, and a memory controller 258. Memory controller 258, host interface 256, and ASIC interface 251 respectively provide interfaces for local memory 180, the host computer, and external integrated circuits such as video decoder 110, video encoder 130, and codec 150. ASIC interface 251 includes a video interface 252, an audio/communications interface 254, and a DMA controller 255. Video interface 252 communicates with video decoder 110 and video encoder 130, and audio/communications interface 254 communicates with codec 150. DMA controller 255 controls DMA (direct memory access) operations between local memory 180 and devices coupled to video interface 252 and codec interface 254. DMA operations proceed without intervention from processor 210 or 220.

Figure 3:
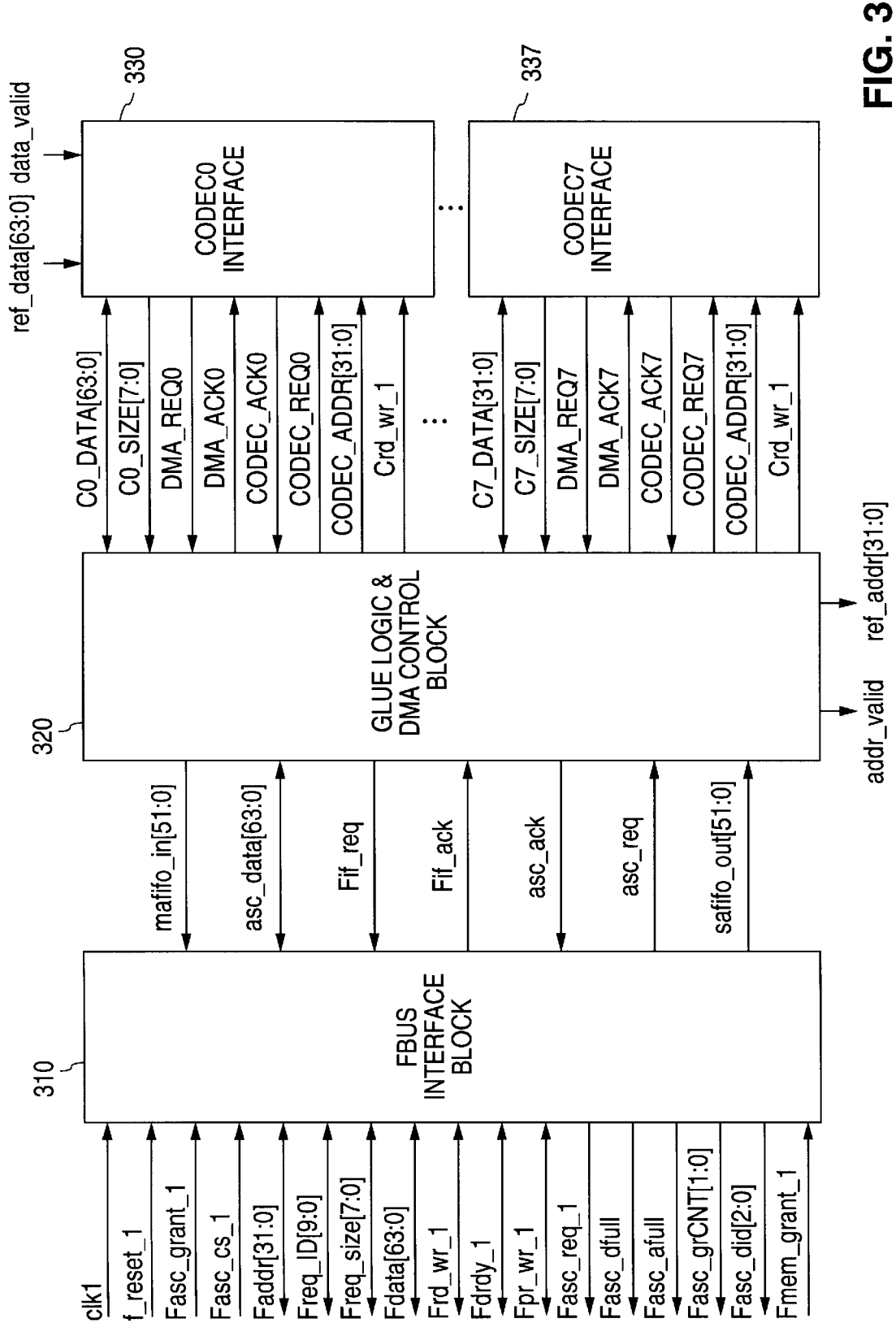
FIG. 3 is a block diagram of an ASIC interface for the multimedia signal processor of FIG. 2.

FIG. 3 illustrates the organization of an embodiment of ASIC interface 251. In this embodiment, DMA controller 255 is illustrated as two blocks an FBUS interface block 310 and a glue logic and DMA control block 320. FBUS interface block 310 implements the protocol necessary to transfer data on FBUS 250. FBUS 250 is a shared bus which is coupled to cache subsystem 230, DMA controller 255, host interface 256, and memory controller 258 as indicated above in regard to FIG. 2. To transfer data, DMA controller 255 requests access to FBUS 250 and indicates memory controller 258 as the target device. A bus arbiter (not shown) grants access according to current use of FBUS 250 and priority of devices requesting access. The arbiter signals memory controller 258 to be ready when the arbiter grants bus access to DMA controller 255. Table A.3 in the Appendix describes the signals employed by FBUS interface 310. Alternative bus interfaces and protocols suitable for FBUS interface 310 and FBUS 250 are well known in the art.

DMA control block 320 provides eight DMA channels which are assigned to up to eight codec interfaces 330 to 337. Each codec interface 330 to 337 is adapted for an external device which uses the associated DMA channel. Although referred to herein as codec interfaces, interfaces 330 to 337 can more generally be adapted to external devices not limited to codecs. In the exemplary embodiment, channel 0 and codec interface 330 are for video encoder 130 which is a KS0119 video encoder available from Samsung Electronics Co., Ltd. DMA channel 2 and codec interface 332 are for video decoder 110 which is a KS0122 available from Samsung Electronics Co. Ltd. DMA channels 4, 5, 6, and 7 are for digital-to-analog and analog-to-digital converters in an audio/communications codec 150 which is an AD1843 available from Analog Devices, Inc.

In addition to access via FBUS 250, DMA control block 320 has direct access to memory controller 258 via a bus carrying an address signal ref_addr and a control signal addr_valid. When signal addr_valid is asserted, memory controller 258 queues a read operation for the amount of data requested by DMA controller 255. Memory controller 258 asserts a signal data_valid to codec interface 330 when the read is complete and a signal ref_dat indicates a 64-bit value read from local memory 180. Signals ref_addr and ref_dat bypass FBUS 250 to transfer video refresh data to video interface 252 without competition for access to FBUS 250.

Figure 4:
FIG. 4 shows control blocks of a serial codec interface in accordance with and embodiment of the invention.

FIG. 4 shows a high level block diagram of audio/communications interface 254. In the exemplary embodiment, interface 254 uses DMA channels 4 to 7 and corresponds to codec interfaces 334 to 337 of FIG. 3. In interface 254, a DMA interface block 430 generates request signals DMA_REQx to DMA controller 255 to request DMA transfer between local memory 180 and interface 254 over DMA channel x, where x is the channel number 4, 5, 6, or 7. Signals C_sizex indicates the size of the DMA transfer. DMA controller 255 asserts an associated signal DMA_ACKx to acknowledge the request. When ready for a DMA transfer on channel x, DMA controller 255 asserts signal CODEC_REQx to interface 254, and DMA interface block 430 asserts signal CODEC_ACKx to acknowledge the request. Signal Crd_wr_1 identifies a register when processor 210 accesses a configuration register in interface 254.

Each DMA channel has an associated 64-bit data signal Cx_DATA which can be an input or output signal depending on which of buffers 411 to 426 is enabled. A control block 440 is a state machine which controls buffers 411 to 426 and a data path to and from codec 150.

Figure 5:
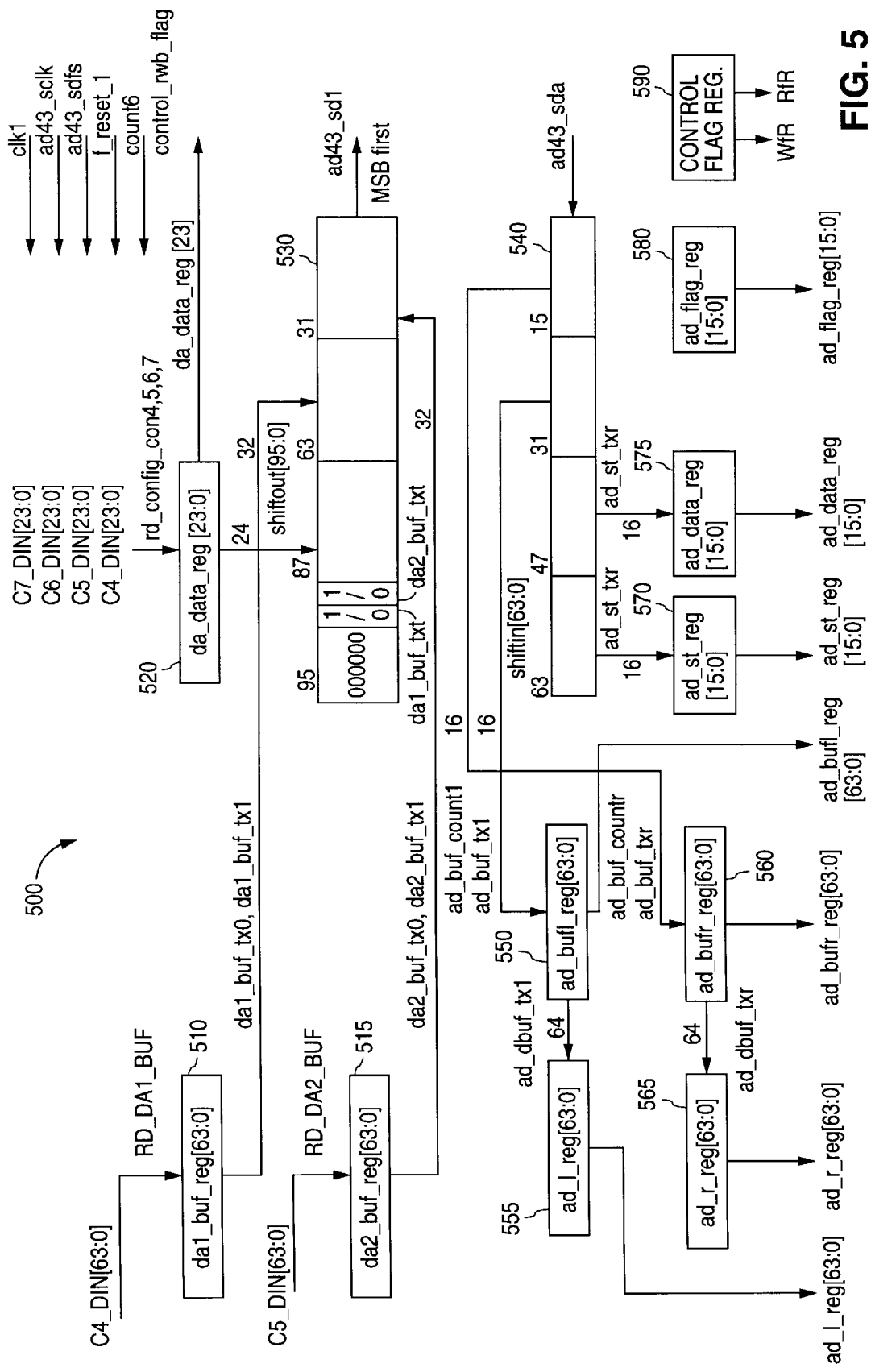
FIG. 5 is a block diagram of data paths associated with the serial codec interface of FIG. 4.

FIG. 5 shows a block diagram of a data path 500 through interface 254. For output, data path 500 includes a shift register 530 of suitable size to hold a data frame for transmission to codec 150. In synchronization with a frame sync signal ad43_sdfs, shift register 530 is loaded with a data frame, and serial transmission of the data frame is begun. Beginning with the most significant bits, bits are transferred from shift register 530 to codec 150 via a serial data signal ad43_sdi at a bit rate controlled by the frequency of a clock signal ad43_sclk.

In the exemplary embodiment, codec 150 is an AD1843 codec available from Analog Devices, Inc. The AD1843 codec employs a serial data communication protocol described in the "Serial-Port 16-Bit SoundComm Codec AD1843" data sheet. For the AD1843, shift register 530 includes 96 bits of data for the portion of a data frame conveying information to codec 150. Data frames are transferred a frame rate of 48 KHz and a bit rate of 12.288 MHz. Each output data frame includes a 16-bit control word, 16 bits of register data, and 64-bits of codec data.

The control word includes six bits reserved bits which are set to zero, two validity bits, a read/write bit, two reserved bits, and a 5-bit register index. The read/write bit and the register index are for controlling access to registers in codec 150. The register index identifies the register being accessed, and the read/write bit indicates whether the access is a read or a write. If the access is a write, the register data in bits <79:64> is the data to be written. Processor 210 accesses codec registers by writing necessary read/write bit, register index, and data to register 520. Any of data signals Cx_DIN can be used when writing to register 520. Once the read or write access information is loaded in shift register 530 further information cannot be loaded at least until the next frame synchronization. A control flag register 590 is set to indicate a read or write to codec 150 is pending. Processor 210 should read register 590 before attempting to write again to register 520.

DMA channels 4 and 5 are for output to codec 150, and each output data frame includes a field (bits <63:32>) for a 32-bit value from channel 4 and a field (bits <31:0>) for a 32-bit value from channel 5. Registers 510 and 515 which are respectively loaded by DMA operation on channels 4 and 5 provide the values loaded into bits <63:0> of shift register 530. The validity bits in the control word indicated which if any of two fields actually contain valid data.

Figure 6:
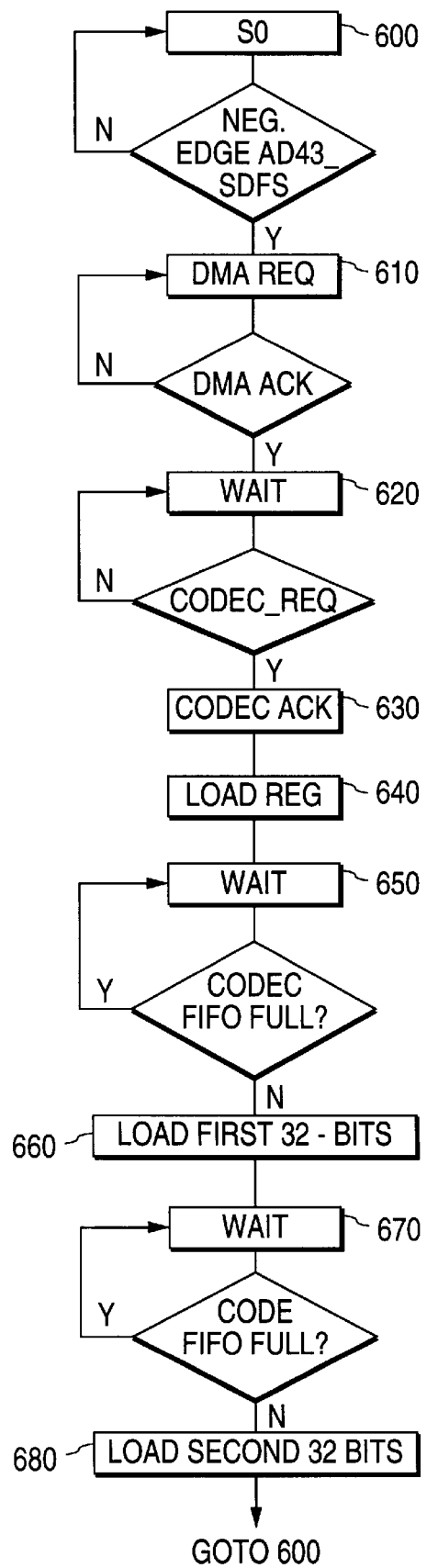
FIGS. 6 and 7 respectively illustrate data output and input processes in accordance with an embodiment of the invention.

FIG. 6 shows a state diagram for a portion of interface 254 which controls data transfer to codec 150 through bits <63:32> of shift register 530. Interface 254 initially remains in a wait state 600 until a negative edge of frame sync signal ad43_sdfs. In state 600, a register 510 is empty. At a negative edge of frame sync signal ad43_sdfs, interface 254 transitions to a state 610, issues a DMA request DMA_REQ4 for DMA channel 4, and waits in state 610 until receiving an DMA acknowledge signal DMA_ACK4. DMA controller 255 acknowledges the DMA request before data is available causing interface 254 to transfer to state 620 and wait for a request signal codec_req4. Upon receiving request signal codec_req4 interface 254 transitions to state 630 and asserts signal code_ack4 to acknowledges the request. Data signal C4_DIN4 is then ready, and interface 252 stores the 64-bit data value from signal C4_DIN4 in register 510.

Transferring the 64-bits from register 510 to codec 150 requires two data frames when codec 150 is not full. In state 650, interface waits until the FIFO buffer in codec 150 can accept data from channel 4. In state 660, the first 32-bits of data are loaded into bits <63:32> of shift register 530. Interface 254 then waits in state 670 until the first 32-bit have been transferred and the FIFO in codec 150 is not full. The second 32-bits from register 510 are then loaded into bits <63:32>, and interface 254 transfers back to state 600.

Interface 254 contains control circuitry which implements nearly the same process described above in regard FIG. 6 for data from DMA channel 5. For DMA channel 5, data flows through register 515 and bits <31:0> of shift register 530 to codec 150.

As shown in FIG. 5, an input portion of data path 500 includes a shift register 540 which receives input data frames a bit at a time via serial data signal ad43_sdo which is output from codec 150 at a bit rate of according to signal ad43_sclk. The input data frames are according to the serial protocol for the AD1843. Each input data frame to interface 254 includes four 16-bit fields respectively for a status word, register data, ADC left data, and ADC right data. Bits <63:48> hold the status word which is transferred to a register 570. The status word indicates whether the ADC left data and/or ADC right data is valid and indicates whether input FIFO buffers in codec 150 are full. If a FIFO buffer is full, transmission of further codec data is delayed as described in regard to FIG. 6 until the FIFO is no longer full.

Bits <47:32> hold a register value from a register of codec 150 which a previous output data frame selected for a read. The register value is stored to a register 575 for transmission to processor 210. Bits <31:16> are the ADC left data for DMA channel 6 and are stored in a 64-bit buffer register 550. Four input data frames are required to fill buffer register 550. When buffer register 550 is full, 64-bits of data are transferred from buffer register 550 to data register 555. The data is transferred 64-bits at time from register 555 to local memory 180 via DMA channel 6. Bits <15:0> are the ADC right data for DMA channel 7 and are stored 16-bits at a time in a 64-bit buffer register 560. When data buffer 560 is full, 64-bits of data are transferred from data register 560 to a data register 565 and from there to local memory 180 via DMA channel 7. A flag register 580 indicates the number of 16-bit values in buffer registers 550 and 560. Processor 210 can access both flag register 580 and buffer registers 550 and 560 to read fewer than 64 bits, for example, at the end of an access to codec 150.

Figure 7:
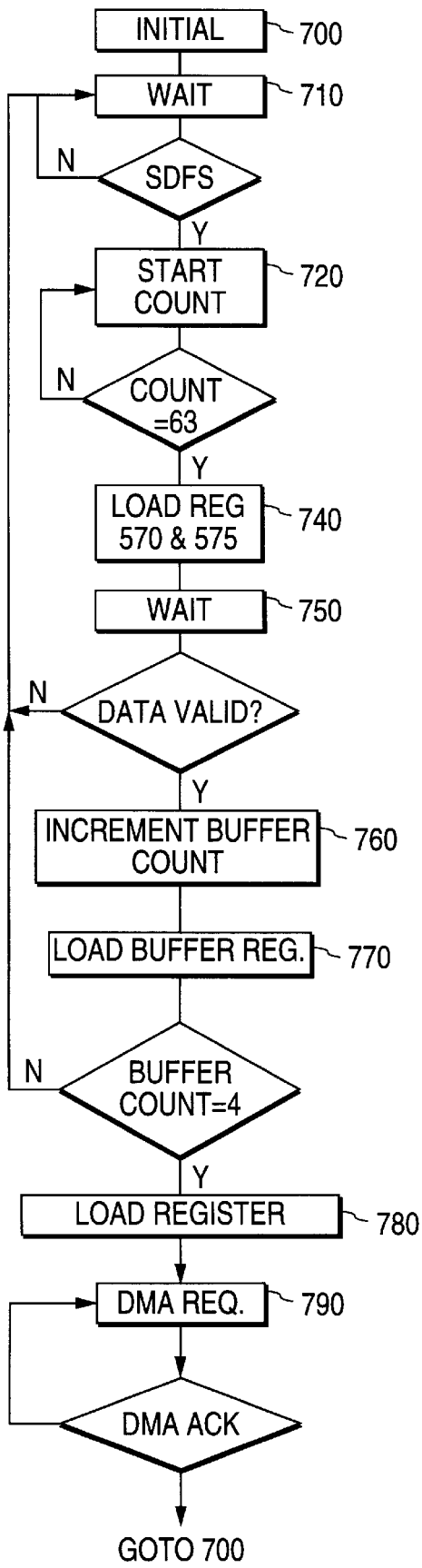

FIG. 7 illustrates the states of interface 254 for transfer of data from codec 150. FIG. 7 is described in regard to transfers from bits <31:16> of shift register 540, through registers 550 and 555 and DMA channel 6 to local memory 180. However, the same process is also used for transfers from bits <15:0> of shift register 540, through registers 560 and 565 and DMA channel 7, to local memory 180. In an initial state 700, registers 540, 550, and 555 are empty and a buffer count in register 580 for register 550 is zero.

Interface 254 waits in state 710 until an edge of frame sync signal ad43_sdfs. After the frame sync signal ad43_sdfs is asserted, interface 254 in state 720 counts the bits shifted into shift register 740. When 64 bits are in register 740, signal ad43_sdo is ignored until the next assertion of frame sync signal ad43_sdfs.

Once shift register 740 is full, interface 254 enters state 740 and loads bits <63:48> and <47:32> into registers 570 and 575 respectively. Register 570 contains bits indicating whether bits <31:16> and <15:0> contain valid data from codec 150. In state 750, interface 254 determines whether bits <31:16> are valid data. If not, interface 254 transitions back to state 710. If bits <31:16> are valid data, interface 254 transitions to state 760 and increments the count in register 580 for data in buffer register 550 and then in state 770 loads bits <31:16> from shift register 540 into a location in buffer register 550 associated with the count. If the buffer count is not four, interface 254 transitions from state 770 to state 710 to wait for another assertion of the frame sync signal ad43_sdfs. If the buffer count is four, interface 254 in state 780 loads 64 bits from buffer register 550 into register 555. Interface 254 then requests a DMA transfer on DMA channel 6, and once the DMA request is acknowledged, transitions back to state 700.

As indicated above, separate DMA channels are assigned to the different ADCs and DACs in codec 150. This separation allows an architecturally simple method for separating data associated with different DACs and ADCs. Accordingly, cross-talk, for example, between audio and communication data is easily avoided. Additionally, the use of a DMA controller to move data to and from a codec provides greater programming flexibility for a processor because the processor is not required to directly handle data transfers for the codec. This flexibility can extend not only to software executed by processor 200 but also to a host computer.

Although the invention has been described with reference to particular embodiments, the description is only an example of the invention's application and should not be taken as a limitation. Various adaptations and combinations of features of the embodiments disclosed are within the scope of the invention as defined by the following claims.

APPENDIX

This appendix describes an exemplary embodiment of ASIC interface 251. ASIC interface 251 contains a programmable 32-bits DMA controller 255 and codec, interface 330 to 337 and provides an interface between the main system bus (FBUS 250) which is running at 80 MHz and devices such as an AD1843 codec for audio or telephone signals, a KS0122 video decoder for video capture, a KS0119 video encoder for overlay and VGA emulation. CODEC interfaces 330 to 337 and DMA controller 320 run at full FBUS speed to avoid synchronization problems.

ASIC interface 251 has three major sections: Fbus master/slave interface 310, 8-channel DMA controller 320, and codec interfaces 330 to 337. Data flows from FBUS 250 to external devices connected to codec interfaces 330 to 337 and visa versa. However, only DMA controller 320 generates an address for DMA operations. This address is then mapped in fbus interface logic 310. All writes from other FBUS nodes program the registers in the CODEC section.

ASIC interface 251 has the following features: 32-bits basic DMA function with 8 channels; two 4-deepx64-bit data FIFOs; one 1-deepx52-bit REQUEST FIFO; one 2-deepx52-bit REPLY FIFO; master/slave control for FBUS 250 and CODEC interface blocks operating at the frequency of 80 MHz; internal arbitration for eight CODEC interfaces with the highest priority for KS0119 video encoder; IO to MEMORY and MEMORY to IO access; support for CODEC initialization; and a special address bus to achieve high performance for video encoder 130.

The codec interfaces support three different CODECs: an (AD1843) audio/communications codec 150 through a bidirectional 64-bit data bus that communicates with the DMA controller via channel 4 for DAC1, channel 5 for DAC2, channel 6 for ADC Left, and channel 7 for ADC Right; a (KS0122) video capture codec 110 through a bidirectional 64-bit data bus and is capable of initiating memory to IO and IO to memory requests to the DMA(Channel 2); and a (KS0119) Video Backend codec 130 which receives data from the Memory Controller 258 directly.

DMA controller 255 has registers for address generation and translation and eight independent channels. Each channel has a current address register and a stop address register. A current address register is loaded whenever one of the eight CODEC's asserts a DMA request. When FBUS 250 grants bus access, the current address register increments each cycle until the current address register matches the stop address register. At that time, DMA controller 255 generates a signal "EOP" (End of process) which causes an interrupt.

DMA controller 255 supports IO to MEMORY, MEMORY to IO, and MEMORY to MEMORY access. Whenever a CODEC interface needs access to DMA controller 255, the codec interface asserts a DMA_REQ signal and waits for DMA controller 255 to acknowledge "DACK". All eight DMA channels have a common arbitration unit which controls multiplexers and address comparison blocks. When acknowledged, the codec interface drives control signals and data. DMA controller 255 selects the appropriate channel depending on the DMA_ACK granted.

DMA controller 255 has a register set that processor 210 can access. In the exemplary embodiment, DMA controller 255 includes the following registers.

Each DMA channel has a 29-bit current address register (bits <31:3>) which requires all addresses to be 8-byte aligned. The current address register is a 29-bit counter which processor 210 can read. Processor 210 can load an initial value through FBUS 255 to the current address register. The current address value is incremented based on the data transfer size. The address in the current address register is sent to an address generation block to load the address on FBUS 250 through a multiplexer. The current address register holds the address value during an idle state.

Each channel has a 29-bit stop address register (bits <31:3>) which requires all addresses to be 8-byte aligned. Processor 210 can write the Stop Address register through FBUS 250. A comparison block in DMA controller 255 compares the stop address values with current addresses. If a current address value matches an associated stop address value, DMA controller 255 generates a signal "EOP" for the associated channel.

The DMA status register indicates whether each channel has reached to the stop address value. Bits <7:0> specify which channel reached to the stop address value and are reset if processor 210 initializes the current address register through CCU 230. Processor 210 can read but not write the DMA status.

The DMA control register contains control information for the operation of DMA controller 255. Bits <7:0> specify which DMA channel is enabled for operation and are reset whenever a corresponding channel reaches a stop address. Processor 210 can set the DMA control register to restart operation. If any channel enable bit is "0", DMA controller 255 will not acknowledge (i.e. assert signal DMA_ACK to) a corresponding CODEC interface even if the CODEC interface sends signal DMA_REQ. Bits <19:16> of the DMA control register specify which pair of DMA channels are linked together to act as a double-buffer. For example, if channel 0 and channel 1 are linked together as a double-buffer, DMA controller 255 automatically switches to channel 1 when the current address of channel 0 reaches it's stop address and switches to channel 0 when the current address of channel 1 reaches it's stop address. Bits <28:21> contain information regarding a read/write mode for each channel. If processor 210 sets any bit of Bits <28:21> to "1", the corresponding channel is used for a READ operation. Others channels are for WRITE operations. Bit <31> specifies whether DMA controller 255 sends signal EOP to interrupt controller 248. If bit <31> is "0", DMA controller 255 does not send signal EOP when a channel reaches to the stop address.

Each bit in the control register has an associated mask bit in the mask register. A mask bit being "0" prevents updates of the corresponding bit in the control register. Initially, the mask register <31:0> is set to FFFF FFFFh.

Processor 210 programs the start and stop address through FBUS 250. FBUS 250 mapped values are as follows:
Cache Control Unit ====>0040_0000-007F_FFFF;
Memory Control unit ===>0080_0000-047F_FFFF;
PCI ====>0800_0000-FFFF_FFFF; and as shown in Table A.1:

TABLE A.1

DMA Register Address Map

| Address Offset <26:0> (hex) | # of Bits | Description |
|---|---|---|
| 4A0_0000 | 29 | Current Address Register 0 |
| 4A0_0008 | 29 | Current Address Register 1 |
| 4A0_0010 | 29 | Current Address Register 2 |
| 4A0_0018 | 29 | Current Address Register 3 |
| 4A0_0020 | 29 | Current Address Register 4 |
| 4A0_0028 | 29 | Current Address Register 5 |
| 4A0_0030 | 29 | Current Address Register 6 |
| 4A0_0038 | 29 | Current Address Register 7 |
| 4A0_0040 | | Reserved |
| 4A0_0048 | | Reserved |
| 4A0_0050 | 29 | Stop Address Register 0 |
| 4A0_0058 | 29 | Stop Address Register 1 |
| 4A0_0060 | 29 | Stop Address Register 2 |
| 4A0_0068 | 29 | Stop Address Register 3 |
| 4A0_0070 | 29 | Stop Address Register 4 |
| 4A0_0078 | 29 | Stop Address Register 5 |
| 4A0_0080 | 29 | Stop Address Register 6 |
| 4A0_0088 | 29 | Stop Address Register 7 |
| 4A0_0090 | | Reserved |
| 4A0_0098 | | Reserved |
| 4A0_00A0 | 32 | Status Register |
| 4A0_00A8 | 32 | Control Register |
| 4A0_00B0 | 32 | Mask Register |

Processor 210 initializes the CODECs through ASIC interface 251. ASIC interface 251 has an address decoder to generate a request signal for each CODEC. Whenever ASIC interface 251 needs to access any CODEC, ASIC interface 251 sends a request signal CODEC_REQ to the codec interface and waits for an acknowledge signal CODEC_ACK from the codec interface. After receiving the acknowledge signal, ASIC interface 251 sends data and address to the codec interface.

When processor 210 wants to read configuration data in any codec interface, CCU 230 access ASIC interface 251 through FBUS 250 and provides an address and a transaction ID. ASIC interface 251 sends the address to the codec interface. ASIC interface 251 sends TRANSACTION ID and configuration data back to CCU 230 upon receiving the data from the CODEC. Table A.2 shows an address map for configuration registers in the codec interfaces.

TABLE A.2

CODEC Configuration Register Address Map

| Address <31:0> (hex) | Description |
|---|---|
| 04B0_0000 to 04BF_FFFF | CODEC0 Configuration Register |
| 04C0_1000 to 04C0_1FFF | CODEC1 Configuration Register |
| 04C0_2000 to 04C0_2FFF | CODEC2 Configuration Register |
| 04C0_3000 to 04C0_3FFF | CODEC3 Configuration Register |
| 04C0_4000 to 04C0_4FFF | CODEC4 Configuration Register |
| 04C0_5000 to 04C0_5FFF | CODEC5 Configuration Register |
| 04C0_6000 to 04C0_6FFF | CODEC6 Configuration Register |
| 04C0_7000 to 04C0_7FFF | CODEC7 Configuration Register |
| 04C0_8000 to 04C0_8FFF | Reserved |
| 04C0_9000 to 04C0_9FFF | Reserved |

TABLE A.3

I/O Signals for the ASIC interface

| Signal Name | Dir | Description |
|---|---|---|
| clk1 | in | 80 MHz system clock input |
| f_reset_1 | in | Fbus reset signal (Low active) |
| Fasc_grant_1 | in | Fbus grant from Fbus Arbitor for ASIC unit(Low active) |
| Fasc_cs_1 | in | ASIC chip select signal (Low active) |
| C0_size[7:0]–C9_size[7:0] | in | CODEC data transfer size: 8'h08=>8 bytes, 8'h10=> 16 bytes, 8'h18 => 24 bytes, 8'h20 => 32 bytes |
| DMA_REQ0–DMA_REQ7 | in | DMA request signals come from CODECs |
| CODEC_ACK0–CODEC_ACK7 | in | CODEC acknowledge signals come from CODECs |
| ref._full | in | FIFO used for screen refresh full signal (comes from the MCU) |
| Fdrdy_1 | in/out | Fbus data ready signal, valid one cycle before actual data. |
| Fdata[63:0] | in/out | Fbus data |
| Faddr[31:0] | in/out | Fbus address |
| Freq_ID[9:0] | in/out | Fbus request ID: [9:6] => requester ID, [5:0] => Transaction ID |
| Freq_size[7:0] | in/out | Fbus data transfer size |
| Frd_wr_1 | in/out | Read/Write indication: "1" => read, "0" => write |
| Fpr_wr_1 | in/out | Partical write indication (Low active) |
| C0_DATA[63:0]–C9_DATA[63:0] | in/out | CODEC data |
| Fasc_dfull | out | ASIC unit data FIFO full. (goes to Fbus arbiter) |
| Fasc_afull | out | ASIC unit reply FIFO full (goes to Fbus arbiter) |
| Fasc_grCNT[1:0] | out | Fbus grant counter which is valid with request to indicate the number of cycles grant is needed for(goes to Fbus arbiter) |
| Fasc_did[2:0] | out | Fbus destination ID to request from ASIC unit |

TABLE A.3-continued

I/O Signals for the ASIC interface

| Signal Name | Dir | Description |
|---|---|---|
| Fasc_recl_1 | out | Fubs request signal from ASIC unit (Low active) |
| CODEC ADDR[31:0] | out | CODEC address which are only used for codec configuration register read/write (goes to CODECs) |
| DMA_ACK0– DMA_ACK7 | out | DMA acknowledge signals (goes to CODECs) |
| Crd_wr_1 | out | Read/Write indication for codec configuration register access. |
| CODEC_REQ0– CODEC_REQ7 | out | CODEC request signals |
| EOP | out | End of Process. This signal goes to interrupt controller. |
| Ref_addr[31:0] | out | Address for CHANNEL0(goes to the MCU) |
| addr_valid | out | Channel0 address valid signal(goes to the MCU) |
| Fmem_grant_1 | in | MCU grant signal comes from FBUS arbiter | the DMA request is not generated for DMA channel 4 or 5. Software executed by processor 210 should check the ADC flag register and read the remaining data through the data bus.

Control registers of codec 150 are read and written by transmitting a read/write request bit along with the control register address in the control word input. When a read is requested, the contents of the control register addressed is transmitted out during the following frame. When a write is requested, the data to be written must be transmitted to the AD1843in the proper field of an output data frame. To improve the performance, the programmer should check the control flag register before reading or writing the control register in codec 150. If the flag bit of control flag register is set, the read and write operation for codec register is available.

DMA data transfer size is 64 bits organized as follows:

|  | bits <63:48> | bits <47:32> | bits <31:16> | bits <15:0> |
|---|---|---|---|---|
| DMA CH4 | DA1 LEFT 2ND | DA1 RIGHT 2ND | DA1 LEFT 1ST | DA1 RIGHT 1ST |
| DMA CH5 | DA2 LEFT 2ND | DA2 RIGHT 2ND | DA2 LEFT 1ST | DA2 RIGHT 1ST |
| DMA CH6 | ADC LEFT 4TH | ADC LEFT 3RD | ADC LEFT 2ND | ADC LEFT 1ST |
| DMA CH 7 | ADC RIGHT 4TH | ADC RIGHT 3RD | ADC RIGHT 2ND | ADC RIGHT I ST |

Audio/communications interface 254 is an interface between a serial bus of an AD1843codec and DMA controller 255. Interface 254 transmits and receives both data and control/status information through serial ports. The AD1843codec has four pins devoted to the serial interface: SDI, SDO, SCLK, SDFS. Pin SDI is for serial data input to the AD1843codec, and pin SDO is for the serial data output from the AD1843codec. Pin SCLK is the serial interface clock. Pin SDFS is a frame sync signal.

The communication in and out of the AD1843codec requires the data bits to be transmitted after a rising edge of signal SCLK for sampling on a falling edge of signal SCLK. Signal SDFS is for the serial interface frame sync. Interface 254 is based on the master mode meaning interface 254 generates signals SCLK and SDFS. The default frequency for signal SCLK is 12.288 Mhz, and the default frame frequency is 48 Khz.

The basic architecture for interface 254 is based on DMA controller 255. Interface 254 uses four different DMA channels: channel 4 for DAC1, channel 5 for DAC2, channel 6 for ADC left and channel 7 for ADC right. The size of channel transfers is 64-bits at a time. DMA channel 4 and channel 5 send two 32 bit data values—16 bits for left and 16 bits for right—from SDRAM 180 to interface 254. On the other hand, DMA channel 6 and 7 send four 16-bit data values at a time from interface 254 to SDRAM 180.

Interface 254 knows data is available from codec 150 from the flag bit in the data frames from codec 150. If a flag bit is reset, interface 254 does not generate the DMA request for channel 6 or 7. If the FIFO for ADC left and right is full, The base Addresses for DMA channels 4 to 7 are:
04C0_4000 DAC1 BASE
04C0_5000 DAC2 BASE
04C0_6000 ADCL BASE (Left Channel)
04C0_7000 ADCR BASE (Right Channel)

Register Map

| Address Offset (hex) | Description | Read or Write |
|---|---|---|
| DAC1 BASE + 0 | Control Register Write Data Input | W |
| DAC2 BASE + 0 | | |
| ADCL BASE + 0 | | |
| ADCR BASE + 0 | | |
| DAC1 BASE + 2 | Control Word Input | W |
| DAC2 BASE + 2 | | |
| ADCL BASE + 2 | | |
| ADCR BASE + 2 | | |
| DAC1 BASE + 0 | Control Register Data Output | R |
| DAC2 BASE + 0 | | |
| ADCL BASE + 0 | | |
| ADCR BASE + 0 | | |
| ADCL BASE + 2 | ADC Flag Register | R |
| ADCR BASE + 2 | | |
| ADCL BASE + 10 | ADC Left 1st Data | R |
| ADCL BASE + 12 | ADC Left 2nd Data | R |
| ADCL BASE + 14 | ADC Left 3rd Data | R |
| ADCL BASE + 16 | ADC Left 4th Data | R |
| ADCR BASE + 10 | ADC Right 1st Data | R |
| ADCR BASE + 12 | ADC Right 2nd Data | R |
| ADCR BASE + 14 | ADC Right 3rd Data | R |
| ADCR BASE + 16 | ADC Right 4th Data | R |
| DACI BASE + 20 | Control Flag Register Data | R |
| DAC2 BASE + 20 | | |
| ADCL BASE + 20 | | |
| ADCR BASE + 20 | | |

Register Definition
Control Register Write Data Input
  The Most Significant Bit (MSB) is the first data input bit to be transmitted.

| Control Word Input | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
|  |  |  |  |  |  |  |  | r/w |  |  | ia4 | ia3 | ia2 | ia1 | ia0 | r/w Read/Write request. Either a read from or write to a Control Register occurs every frame. Setting this bit to "1" indicates a Control Register read, and resetting this bit to "0" initiates a Control register write.
ia[4:0] Control Address register for read or write.

Control Register Data Output
  Contents of Control Register addressed in previous frame.

| ADC Flag Register | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
|  |  |  |  |  |  |  |  | r4v | r3v | r2v | r1v | 14v | 13v | 12v | 11v | r4v–r1v Valid ADC Right data is in the buffer. Indicate which data is available in the buffer.
14v–11v Vaild ADC Left data is in the buffer. Indicate which data is available in the buffer.

ADC Left 1st Data
  ADC left first data in the buffer.
ADC Left 2nd Data
  ADC Left second data in the buffer.
ADC Left 3rd Data
  ADC Left 3rd data in the buffer.
ADC Left 4th Data
  ADC left 4th data in the buffer

| Control Flag Register | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
|  |  |  |  |  |  |  |  |  |  |  |  |  |  | wfl | rfl | wfl Control Register write flag. If set, the CODEC is ready for receiving the control register data.
rfl Control Register read flag. If set, the CODEC is ready for sending the control register data.

We claim:

1. An integrated processor comprising:
   a processing core;
   a host bus interface for connection to a host computer system;
   a memory controller for connection to a local memory;
   an interface circuit adapted for connection to a codec, wherein the interface circuit comprises:
     a shift register which generates a serial data signal corresponding values of bits shifted out of the shift register;
     a first buffer coupled to load a value from the first buffer into a first field in the shift register; and
     a second buffer coupled to load a value from the second buffer into a second field in the shift register; and
   a direct memory access unit coupled to transfer data between the interface circuit and the local memory without intervention from the processing core, wherein the direct memory access unit comprises a first channel coupled to supply data values from a memory to the first buffer, and a second channel coupled to supply data values from the memory to the second buffer.

2. The processor of claim 1, wherein the interface circuit further comprises:

a second shift register is loaded by shifting bits from a serial input data signal to the shift register;

a third buffer coupled to load a value from a first field in the second shift register; and a fourth buffer coupled to load a value from a second field in the second shift register, wherein the direct memory access unit further comprises a third channel coupled to transfer data values from the third buffer to the memory, and a fourth channel coupled to transfer data values from the fourth buffer to the memory.

3. An integrated processor comprising:
   a processing core;
   a host bus interface for connection to a host computer system;
   a memory controller for connection to a local memory;
   an interface circuit adapted for connection to a codec, wherein the interface circuit comprises:
     a shift register is loaded by shifting bits from a serial input data signal to the shift register;
     a first buffer coupled to load a value from a first field in the shift register; and
     a second buffer coupled to load a value from a second field in the shift register; and
   a direct memory access unit coupled to transfer data between the interface circuit and the local memory without intervention from the processing core, wherein the direct memory access unit comprises a first channel coupled to transfer data values from the first buffer to an external memory, and a second channel a second channel coupled to transfer data values from the second buffer to an external memory.

4. A system comprising:

a host computer having a local bus; and a device coupled to the local bus, wherein the device comprises:
- a local memory;
- a codec; and
- a processor that includes:
  - a processing core;
  - an interface circuit adapted for connection to the codec, wherein the interface circuit comprises:
    - a shift register which generates a serial data signal corresponding values of bits shifted out of the shift register;
    - a first buffer coupled to load a value from the first buffer into a first field in the shift register; and
    - a second buffer coupled to load a value from the second buffer into a second field in the shift register; and
  - a direct memory access unit coupled to transfer data between the interface circuit and the local memory without intervention from the processing core, wherein the direct memory access unit comprises a first channel coupled to supply data values from the local memory to the first buffer, and a second channel coupled to supply data values from the local memory to the second buffer.

5. The system of claim 4, wherein the interface circuit further comprises:
- a second shift register is loaded by shifting bits from a serial input data signal to the shift register;
- a third buffer coupled to load a value from a first field in the second shift register; and
- a fourth buffer coupled to load a value from a second field in the second shift register, wherein the direct memory access unit further comprises a third channel coupled to transfer data values from the third buffer to the local memory, and a fourth channel coupled to transfer data values from the fourth buffer to the local memory.

6. A system comprising:

a host computer having a local bus; and a device coupled to the local bus, wherein the device comprises:
- a local memory;
- a codec; and
- a processor that includes:
  - a processing core;
  - an interface circuit adapted for connection to the codec, wherein the interface circuit comprises:
    - a shift register which generates a serial data signal corresponding values of bits shifted out of the shift register;
    - a first buffer coupled to load a value from the first buffer into a first field in the shift register; and
    - a second buffer coupled to load a value from the second buffer into a second field in the shift register; and
  - a direct memory access unit coupled to transfer data between the interface circuit and the local memory without intervention from the processing core, wherein the direct memory access unit comprises a first channel coupled to transfer data values from the first buffer to the local memory, and a second channel a second channel coupled to transfer data values from the second buffer to the local memory.

* * * * *